United States Patent
Chapman et al.

(10) Patent No.: US 12,078,046 B2
(45) Date of Patent: Sep. 3, 2024

(54) SYSTEM AND METHOD FOR A FRAC SYSTEM

(71) Applicant: Catalyst Energy Services LLC, Odessa, TX (US)

(72) Inventors: Bobby Joe Chapman, Odessa, TX (US); Sean Dee Edwards, Odessa, TX (US); Michael Gerard King, Odessa, TX (US); Seth Richard Moore, Odessa, TX (US); Kevin Martin Voldarski, Odessa, TX (US)

(73) Assignee: Catalyst Energy Services LLC, Odessa, TX (US)

( * ) Notice: Subject to any disclaimer, the term of this patent is extended or adjusted under 35 U.S.C. 154(b) by 0 days.

(21) Appl. No.: 18/137,642

(22) Filed: Apr. 21, 2023

(65) Prior Publication Data

US 2023/0258064 A1    Aug. 17, 2023

Related U.S. Application Data

(63) Continuation of application No. 17/507,636, filed on Oct. 21, 2021, now Pat. No. 11,661,831.

(60) Provisional application No. 63/250,965, filed on Sep. 30, 2021, provisional application No. 63/187,757, filed on May 12, 2021, provisional application No. 63/104,982, filed on Oct. 23, 2020.

(51) Int. Cl.
```
F02C 7/052    (2006.01)
E21B 43/26    (2006.01)
F02C 7/36     (2006.01)
```
(52) U.S. Cl.
CPC .......... *E21B 43/2607* (2020.05); *F02C 7/052* (2013.01); *F02C 7/36* (2013.01)

(58) Field of Classification Search
CPC .... F02C 7/05; F02C 7/052; F02C 7/36; E21B 43/2607
See application file for complete search history.

(56) References Cited

U.S. PATENT DOCUMENTS

| 9,429,078 B1 | 8/2016 | Crowe et al. |
| 9,638,101 B1 | 5/2017 | Crowe et al. |

(Continued)

FOREIGN PATENT DOCUMENTS

| EP | 1013911 A2 | 6/2000 | |
| GB | 2409003 A * | 6/2005 | ............. F01D 15/10 |

OTHER PUBLICATIONS

PCT International Preliminary Report on Patentability issued on PCT/US2021/056128; dated Aug. 8, 2022; 16 pages.

(Continued)

*Primary Examiner* — Steven M Sutherland
(74) *Attorney, Agent, or Firm* — Braxton Perrone, PLLC; Bobby W. Braxton; Gregory Perrone

(57) ABSTRACT

A system and method for a frac pump. The system includes a turbine. The turbine can be 100% powered by natural gas or other fuels. The turbine, which can have an OEM controller, drives a frac pump. The frac pump is used for fracturing. The system has a controller which controls the system, including the OEM controller. The system has an air filtration system to treat the air entering the turbine. The air filtration system can include a system with no moving parts and no filters. The system fits within a trailer so it can be transported to remote locations. The system is self-sufficient.

18 Claims, 8 Drawing Sheets

(56) References Cited

U.S. PATENT DOCUMENTS

| | | | |
|---|---|---|---|
| 9,869,305 B1 | 1/2018 | Crowe et al. | |
| 9,879,609 B1 | 1/2018 | Crowe et al. | |
| 10,415,557 B1 | 9/2019 | Crowe et al. | |
| 10,760,556 B1 | 9/2020 | Crom et al. | |
| 10,815,764 B1 | 10/2020 | Yeung et al. | |
| 10,895,202 B1 | 1/2021 | Yeung et al. | |
| 10,954,855 B1 | 3/2021 | Ji et al. | |
| 10,955,130 B1 | 3/2021 | Mcintyre, II et al. | |
| 10,961,908 B1 * | 3/2021 | Yeung | F01D 15/10 |
| 10,961,993 B1 | 3/2021 | Ji et al. | |
| 11,047,379 B1 | 6/2021 | Li et al. | |
| 2014/0086769 A1 | 3/2014 | Barnett, Jr. et al. | |
| 2015/0084340 A1 * | 3/2015 | Kuczaj | F02C 7/36 |
| | | | 290/52 |
| 2016/0369609 A1 * | 12/2016 | Morris | F04B 17/03 |
| 2018/0266412 A1 | 9/2018 | Stokkevåg et al. | |
| 2019/0063341 A1 | 2/2019 | Davis | |
| 2020/0040878 A1 | 2/2020 | Morris | |
| 2020/0190967 A1 * | 6/2020 | Gooneratne | H04N 23/00 |

OTHER PUBLICATIONS

PCT Search Report with Written Opinion issued on PCT/US2021/056128; dated Feb. 2, 2022; 18 pages.

* cited by examiner

FIG. 4

SYSTEM AND METHOD FOR A FRAC SYSTEM

This application is a continuation of allowed application Ser. No. 17/507,636 filed Oct. 21, 2021, entitled "System and Method for a Frac System" and claims priority to U.S. Priority No. 63/104,982 filed Oct. 23, 2020; U.S. Priority No. 63/187,757 filed May 12, 2021; and U.S. Priority App. No. 63/250,965, filed Sep. 30, 2021, the entirety of all of which are hereby incorporated by reference.

BACKGROUND OF THE INVENTION

Technical Field

The present invention relates to a system and method for turbine operated fracturing pumps.

Description of Related Art

Hydraulic fracturing (fracking) is a well stimulation technique where a fracking liquid is injected into rock formations at high-pressures, allowing for the extraction of oil and natural gas. There are several variables surrounding the control of a frac pump. When one variable changes, this has an impact on many other variables. Adding or subtracting pumps and other equipment due to demand further alters the control. Consequently, there is a need for a system and method of controlling and operating frac pumps.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 4 is a screenshot of the sensors in one embodiment;

DETAILED DESCRIPTION

Figure 1:
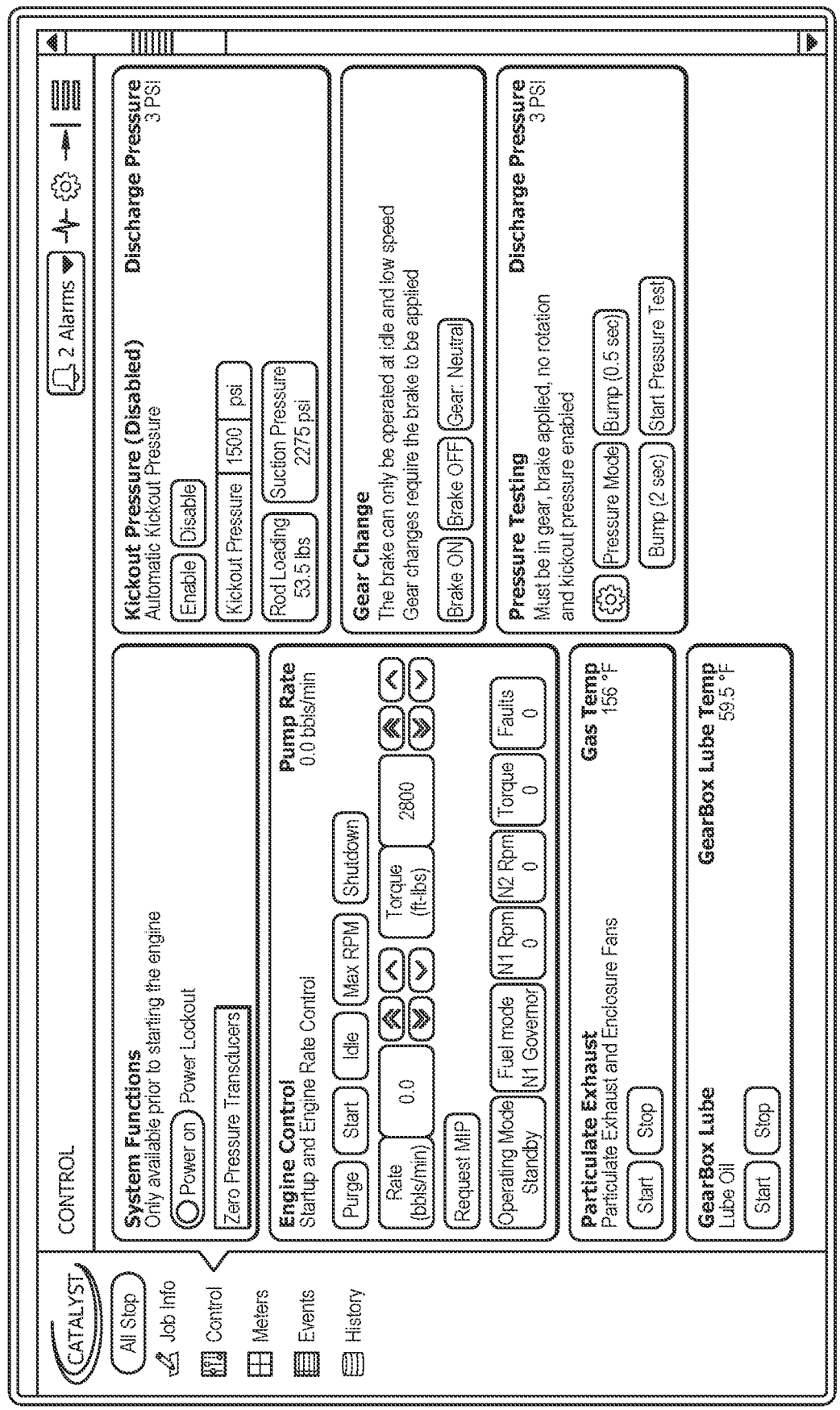
FIG. 1 is a screenshot of a control page of the frac controller in one embodiment.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

As noted, frac pumps are used to assist in fracturing drilling operations. There are various ways to provide power to a pump. In one embodiment discussed herein, a turbine is used to power the high pressure frac pump.

Various turbines can be utilized. In one embodiment the turbine comprises a Vericor turbine. One such turbine uses its own FADEC-style engine controller for controlling operation of the turbine. Thus, in one embodiment each turbine has its own OEM controller. An OEM controller is a controller which was installed on the component equipment.

The turbines can be powered by any traditional fuel. In one embodiment they are powered by natural gas, or some derivative. Being powered by natural gas, in some embodiments, allows the turbines to be placed remotely onsite. In one embodiment the turbines are 100% powered by natural gas.

As noted, the turbines can be powered by different fuels such as diesel, natural gas, hydrogen, ammonia, etc. In some embodiments the turbines can be fueled by blended fuels. This is a benefit which increases flexibility of the system. The system can operate with a broader range of gas quality, leading to a significant cost savings for the operator.

The turbines create significant horsepower which can be conveyed to a frac pump. Virtually any pump used for fracking can be utilized. In one embodiment the pump comprises a multi-plunger pump. In one embodiment the pump comprises a positive displacement pump. The pump, whatever the type, delivers materials down-hole for fracking. In one embodiment the pumps generator 40,000 HHP. This reduces the HHP footprint by 70% in some embodiments, compared to the prior art.

Control Systems

The fracking system, in one embodiment, utilizes a plurality of sub-control systems. While, in one embodiment, the turbine has its own FADEC-style controller, this controller is controlled by the master controller. Accordingly, all of the inputs and variables monitored and controlled by the FADEC turbine controller are also controlled by the umbrella frac controller. In one embodiment the FADEC turbine controller offers continuous communication checks and interlocks on engine faults, with engine specific monitoring and limit alarms, while the superset of controls with the umbrella frac controller adds command acknowledgement, safety checks, interlocks, subsystem controls and an extended plurality of IO points.

In one embodiment the umbrella frac controller uses the input data needed to monitor equipment. This can include temperature, pressure, flow rates, vibration, gear position, battery level, fuel level, fuel consumption, etc.

The frac controller also reviews and controls the equipment enclosure system with gas detection, fan ventilation and limit monitoring with lockout alarms. Integrating these equipment enclosure systems with the frac controller provides for increased safety as well as environmental protection.

In one embodiment the frac controller also has a subsystem which includes a Gearbox system. This system includes oil pre-heating, oil pressure and circulation pump control. In one embodiment the system includes temperature limits and lockout alarms along with low oil pressure alarms. As noted, this is not a standalone feature but it is integrated within the umbrella controller.

The frac controller, in one embodiment, further includes a system for monitoring the Shale Pump system. The Shale Pump system can include oil pressure and circulation pump control, temperature limits, lockout alarms, and/or low oil pressure alarms.

In one embodiment the frac controller further comprises a brake and shale pump gear control with safety locks to protect the engine, equipment and operators. As an example, the gear changes and brake controls can be interlocked with various position feedback sensors.

The umbrella frac controller, in one embodiment, includes a system for monitoring and controlling pressure control and kickout. This allows precise pressure to be achieved using precision torque and brake control while maintaining safety pressure limits at all times.

Safety Systems

The systems described above result in increased safety. However, in another embodiment, there are several safety interlocks which ensure the system can be safely controlled while the equipment is properly monitored and protected against harmful operation and unsafe or poor operating procedure. In one embodiment the system comprises sound and heat proofing.

In one embodiment various early warning limits are shown to the operator to help present inadvertent shutdowns or equipment damages. Further, in one embodiment, automated engine idle occurs with various operating limits. Some examples include high temperatures, low flow rates, low oil pressures, excessive vibration, and other possible equipment parameters.

In some embodiments the system comprises one or a plurality of vibration sensors. Since the turbines are rotating as high rotational speeds, vibration sensors can often determine if equipment is operating in the desired manner. The vibration sensors can be located at various locations. In one embodiment one or two sensors are located on the turbine, one is located on the gearbox, and one or more are located on the pump. In one embodiment five separate vibration sensors are placed at various locations on the pump—fluid side, power side, plunger, valves, seats, etc. The vibration sensors can determine system efficiency and health. In doing so, the sensors also increase safety.

In some embodiments operator lockout is implemented to ensure unsafe operations cannot be performed when the system is not ready, in a good state, or when any other subsystem creates a lockdown condition. Additionally, the network is protected with control options often requiring a password.

In some embodiments real time pump calculations and limits are applied for road loading, pinion torque limiting, and rate limits needed to protect the equipment.

In one embodiment the system comprises a fire suppression system. The fire suppression system can be coupled with thermometers, thermo-couples, and cameras to determine and predict a fire. In one embodiment the system comprises a thermal camera. Thermal cameras can detect a variety of issues, including a leak. This can be used in the fire suppression system to monitor heat loss, heat build-up, etc. However, it can also diagnose a leak at a pump or valve as well. As such, the thermal cameras can be in communication with the control system to stop a leaky valve or pump, as an example.

In one embodiment the system comprises one or more multi-gas meters which is used for detecting the presence of gas. The engine will not start if gas is detected. Further, the turbine can be stopped if gas is detected. Additionally, in other embodiments, the system sends an alert if gas is detected. Other systems such as carbon monoxide detectors can also be utilized.

In some embodiments the operators need approval and are automatically limited by time, access to high risk functions, and equipment operations that cause excessive wear or risk.

The above referenced systems provide increased safety. In one embodiment, because the umbrella frac controller controls both the turbine and the pump, as well as the enclosure systems, and other subsystems, the controller has a better global view that other prior art frac pumps. The frac controller has a clearer and more comprehensive picture of the operational process than traditional systems. Accordingly, the safety subsystem is more comprehensive and robust.

In one embodiment the turbine and umbrella frac control each comprise wireless remote access. Accordingly, no local operation is required. This allows operators to operate and control the turbine and the frac pump remotely. Placing distance between human operators and the high-pressure operating equipment further increases safety. Additionally, rather than having a single local operator make decisions, the decisions can be made remotely by a team. This further increases safety and efficiency.

In one embodiment a camera is utilized to allow an operator to remotely view the operation of the system. In one embodiment the camera is a 360° camera system. The operator can monitor to ensure that valves which were supposed to open were open, as an example. This allows the operator to view equipment in the red zone without physically being present in the red zone. The red zone is often referred to as the area where workers are not allowed during operation. If there is a problem, the operator can remotely correct the problem without physically being present in the red zone.

In one embodiment, virtually any web enabled device, such as a smart phone, laptop, tablet, etc. can function as the turbine and frac control center. This provides unprecedented control with multiple user monitoring from a safe environment. Additionally, one or more operators can safely maintain and control a plurality of frac systems. Thus, rather than simply providing remote access, or the ability to monitor remotely, in one embodiment the user has the ability to control the system remotely. In some embodiments this amounts to controlling the full functionality of the unit or plurality of units. In some embodiments real-time data is obtained. Safety control systems can be monitored and controlled. The user can modify setpoints and parameters from a safe distance.

In one embodiment the system includes a full Internet of Things stack of technologies from the control system in the field through to the cloud infrastructure on Amazon Web Services (AWS) to enable a simple access to live field data from the turbine controls to anywhere in the world.

In one embodiment the frac system allows completely remote start and shutdown operation. This was not previously possible with prior art systems which required local operators.

As noted, the frac controller can monitor and control a wide variety of control outputs. These can include controlling variable vane positioning, fuel rate, bleed band settings, brake settings, gear position, gear selection, etc. These are not common control outputs. These can be synchronized with other frac controls such as those utilized on fleets containing diesel, electric, dynamic gas blending or reciprocating gas engines.

In one embodiment the system utilizes chip detection. As engines wear, the metal can begin to chip. A chip detector monitors and detects chips, shavings, foreign particles, etc. within the engine. A chip detection can be used to monitor the health of the component. Thus, improving safety and performance of the engine.

Multi Pump Control

While for simplicity sake an embodiment utilizing a single turbine and a single pump has been described, this is for illustrative purposes only and should not be deemed limiting. In other embodiments, two or more pumps and or turbines can be utilized. The pumps can be the same or different pumps. For example, one pump may be powered by the turbine, as previously described, while the second pump may be an electric or diesel pump. In one embodiment, the plurality of pumps is controlled by the same umbrella frac controller described herein.

Certainly, having multiple pumps increases the control variables as the pumps must now be coordinated. Pressure control and limiting is achieved when multiple pumps are communicating via their control systems to coordinate which pump is managing pressure limit and pressure control. In one embodiment the system utilizes automated rate selection and rate balancing across the system utilizing multiple pumps. The various pumps to use, throttle, etc. can be based on a variety of factors including pressure, flow rate, and price. As an example, the system can consider the cost of an additional diesel pump. If the price of diesel, for example, significantly outweighs the cost of natural gas from the turbine, the use of the diesel pump can be reduced to minimize cost. However, if increased pressure or feed rate is required, the use of the diesel pump can be increased. The frac control system provides a system to control multiple pumps and balance multiple factors, such as pressure, feed rate, and cost of operation, which was not previously possible.

Additionally, in one embodiment with multi-pump operation, the system offers instantaneous drop-out detection and auto rate recovery. Thus, as noted, pumps can be added or decreased to maintain a desired pressure and feed rate.

In one embodiment the umbrella frac controller can be controlled by a single laptop or single user. Thus, a single command can go out simultaneously to the various FADEC/OEM controllers. Thus, one signal can be sent to six separate pumps, as an example. In other embodiments, six separate commands will be sent from the umbrella frac controller to the six, as an example, separate FADEC controllers. There are several different possibilities. A single unit can be controlled at a time. Or, two or more units can be placed in a group. The umbrella frac controller can send a single instruction to the group's OEM controllers. Or, the frac controller can send out the same or different instructions to each member of the group.

Operation

As noted, in one embodiment the system uses at least one high horsepower pump. This allows the system to achieve the necessary rates with much less equipment while operating more efficiently compared to systems with comparatively smaller horsepower pumps. As noted, in one embodiment fuel consumption is tracked and used in calculating needed equipment. Fuel usage curves are balanced with multiple turbines in order to use the most efficient power ranges of the turbines to achieve the desired rates. This is contrasted with the prior art method whereby traditional hydraulic pumps are either replaced or limited to efficient fuel usage ranges by the turbine to minimize fuel costs and consumptions.

As noted, in one embodiment the system is designed to be placed in remote locations. In one such embodiment the system utilizes a body load truck designed to make the unit mobile for field operations. This allows the unit to be easily transported to and from the site using roads, increasing agility. The size further reduces the footprint required for the system. By having a smaller footprint, the ratio of horsepower to foot print (square foot) is increased.

As noted, in one embodiment the turbine utilizes natural gas. Accordingly, in such embodiments the system is self-contained and the need for auxiliary power or external utility support is eliminated. This is a significant advantage because the system can simply be placed at the drilling site without need for separate utilities to be hard-wired or delivered on site.

In one embodiment the system utilizes a multi-speed gearbox to increase the operating range of the turbine engine and the pump. In one embodiment the system utilizes an 11:1 gear reduction, connected to the turbine, to optimize the turbine output shaft speeds with the needs of the transmission. The reason, as discussed, is that the turbine results in rotational speeds up to 20,000 RPM, as but one example. The second fan, discussed in more detail below, has a reduced rotational speed of up to 16,000 RPM. These specific rotational speeds are provided for illustrative purposes only. These specific speeds will depend upon the size of the turbine, fans, and other factors. A gear box, or series of gear boxes, reduces those rotational speed to one that can be utilized by the pumps.

Within the gearbox, in one embodiment, there are bearings to reduce friction. In one specific embodiment roller bearings are utilized.

In one embodiment the system utilizes a floating drive shaft. This is used to couple the main gearbox to the transmission (multi-speed gearbox) without the need for a U-joint. One advantage of this approach is reduced vibration and simplified driveline.

The drive shaft can be controlled via any method or device known in the art. This can include a transmission, a gear box, etc. As but one non-limiting example, the unit comprises a variable speed drive. Thus, instead of a traditional transmission with gears, the variable speed drive would be utilized. A variable speed drive has virtually infinite ratios between the starting point and the end point of the geometric ratios. A belt, chain, or the like is used to transfer the torque.

In one embodiment the drive shaft is eliminated altogether. In such an example the turbine is connected to the gearbox, which is connected to the pump. This is a one-piece drive-chain assembly. Eliminating a drive shaft has many benefits in some embodiments. In some embodiments eliminating a drive shaft allows for a shorter smaller footprint. Further, drive shafts can have limitations as to torque and vibration. Eliminating the drive shaft reduces these limitations. In some embodiments rather than having a drive shaft, the components are directly coupled via gears or the like.

In one embodiment the system utilizes a braking system, as previously discussed. The braking system utilizes an electric over hydraulic disc brake to aid in the stopping shaft output when needed. This system is also controlled by the umbrella frac controller to aid in pressure testing service iron by utilizing a pulsation technique to achieve small shaft rotations necessary for controlled pressure tests.

FIG. 1 is a screenshot of a control page of the frac controller in one embodiment. As shown the operator can see and control the engine control. The user can also monitor the particulate exhaust, the gearbox lube, the kickout pressure, the gear change, and the pressure testing.

Figure 2:
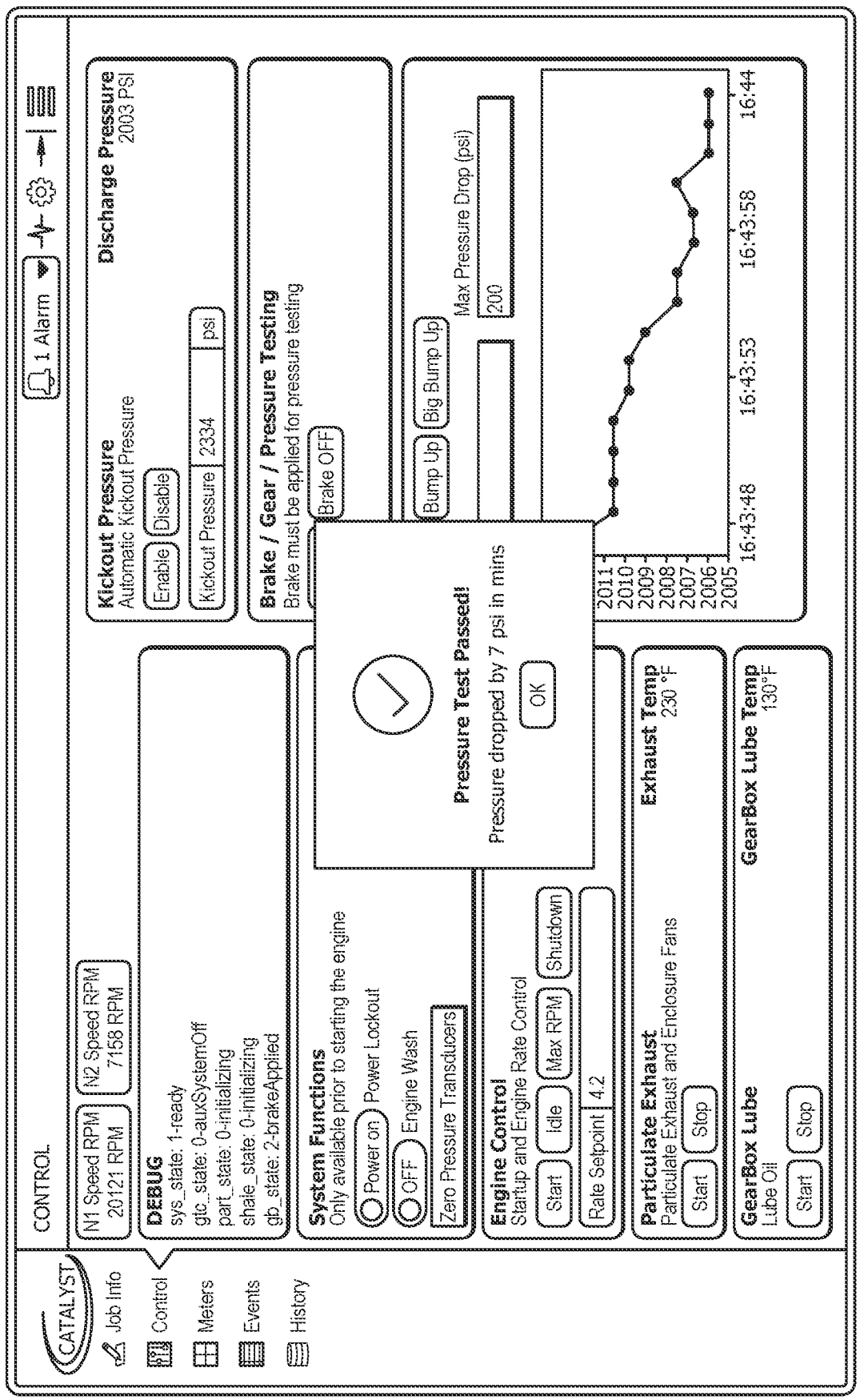
FIG. 2 is a screenshot of a pressure test in one embodiment.

FIG. 2 is a screenshot of a pressure test in one embodiment. In one embodiment pressure control is done with a set of unique torque control algorithms so that fine pressure adjustments, stable control and ramps can all be performed with a torque control mechanism. Several methods such as stepped pressure controls, smooth ramping, as well as mapped torque setpoints allow pressure to be finely controlled with this new method. Thus, the torque is specified and the system determines the corresponding desired pressure. The user can then monitor the actual pressure to see if it deviates from the desired pressure. In other embodiments, the opposite occurs. Specifically, a pressure is inputted, the system calculates a corresponding torque, and the resulting torque is measured. The user can then compare the actual torque with the expected torque. The user can then make changes to reach the desired output, whether it is torque or pressure. This systems provide an opportunity to pressure test the system.

Figure 3:
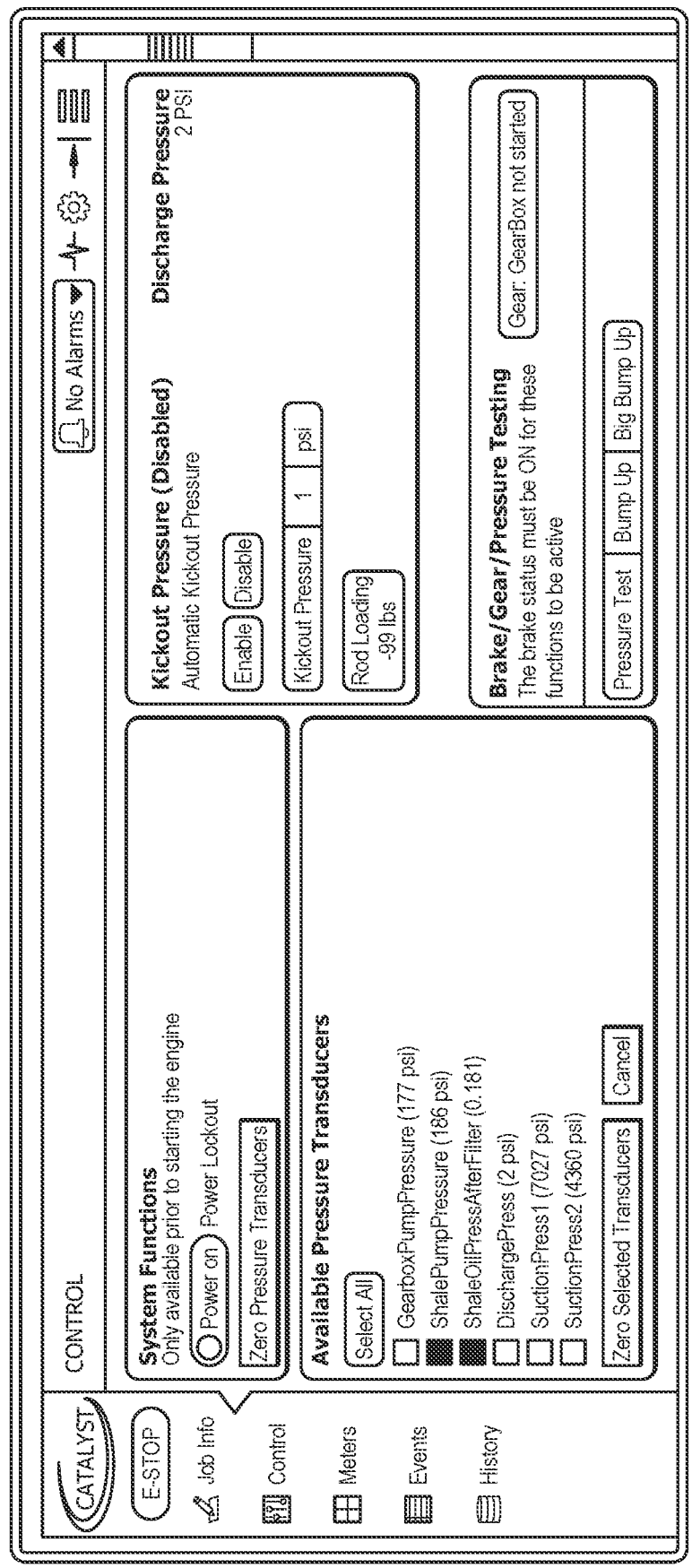
FIG. 3 is a screenshot of the transducer zeroing in one embodiment.

FIG. 3 is a screenshot of the transducer zeroing in one embodiment.

Figure 4:
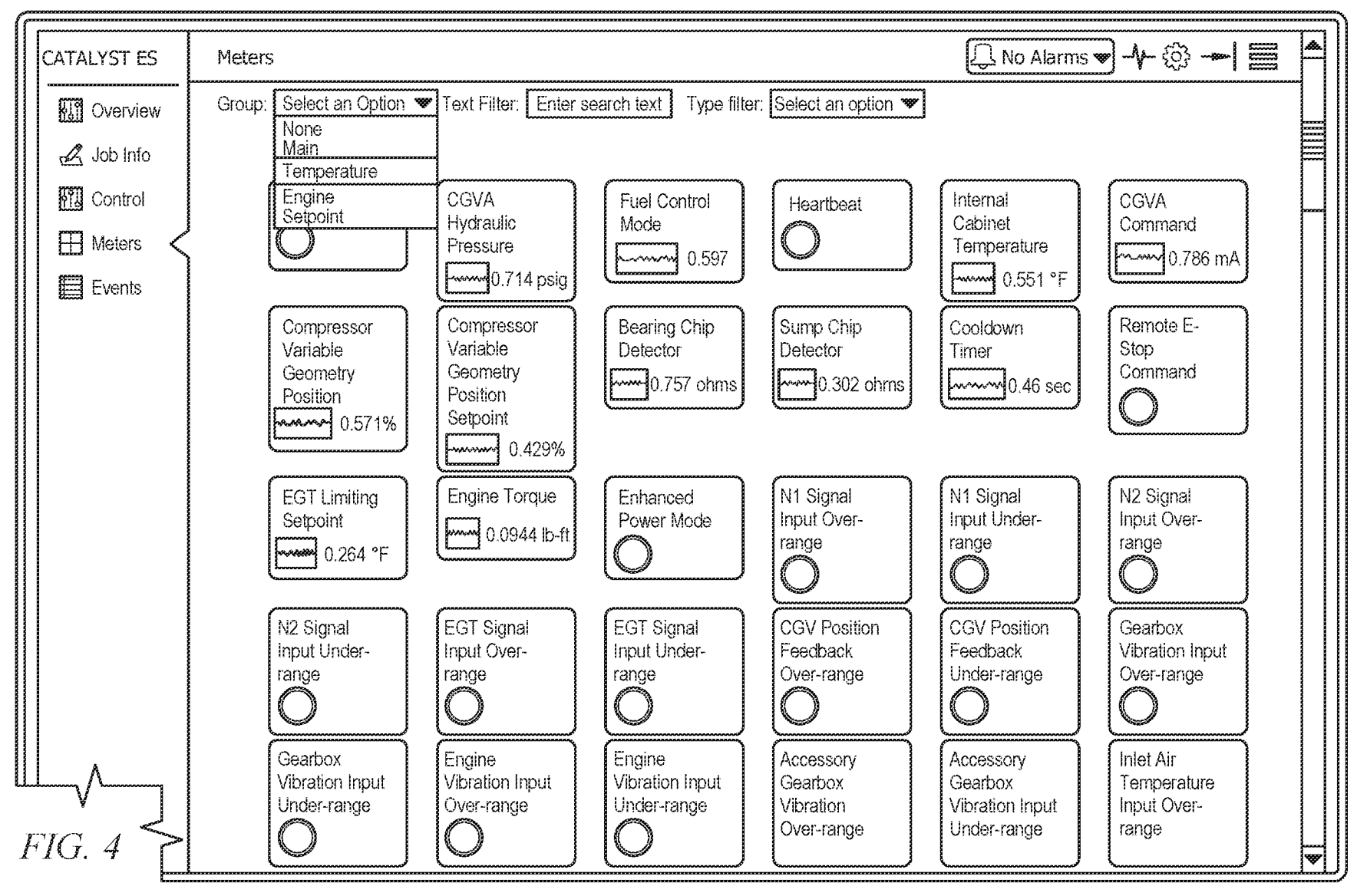

FIG. 4 is a screenshot of the sensors in one embodiment. As shown the operator can see the output of a sensor or a plurality of sensors and/or measurements of the system in real time. As depicted, the screenshot identifies alerts and color-coordinates various alerts. However, those of ordinary skill will understand the various methods to highlight various outputs and events to instruct the user to take corrective action based on the seriousness of the event. As noted, in certain embodiments, the system employs a plurality of various sensors. The data collected from these sensors can be invaluable in predicting equipment failure, unintended events, catastrophic events, etc. Thus, in one embodiment the data from the sensor or plurality of sensors allows for learning of the sensor output and any follow-up event. This provides for machine learning, or AI. This allows for predictive maintenance and the prevention of undesired events. This improves safety and efficiency of the system.

Figure 5:
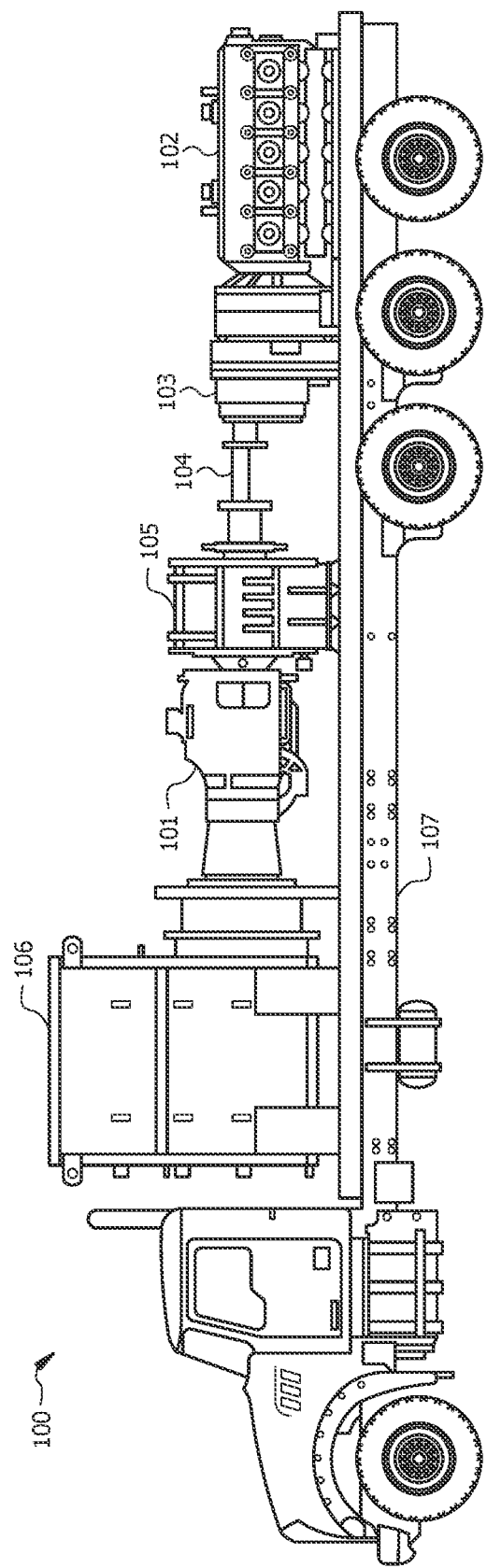
FIG. 5 is a schematic of the turbine and frac pump in one embodiment.

FIG. 5 is a schematic of the turbine and frac pump in one embodiment. As shown in FIG. 5, both the turbine 101, the frac pump 102, and the supporting equipment all fit on a single trailer 107. In one embodiment the trailer 107 comprises an eight-inch Marine Channel Frame on Vibration Isolation. This helps reduce vibration and increase stability.

In one embodiment the turbine 101 is housed in an enclosure. As noted, the enclosure can have a fire suppression system. The enclosure can comprise an IR sensor and/or an IR camera.

In one embodiment the enclosure houses the engine, the gear box, and the exhaust system.

As shown, the pump 102 is at the back of the trailer 107. As previously noted, the pump can comprise virtually any pump. In one embodiment it is a positive displacement pump. As shown, the pump comprises five plungers. This, however, is for illustrative purposes only and should not be deemed limiting.

Coupled to the pump 102 is the gear box 103 previously described. This assists in braking as well as control of the rotation of the pump.

Coupled to the gear box 103 is the drive shaft 104. As noted previously, in one embodiment the drive shaft 104 is a floating drive shaft. The drive shaft 104 couples the gear box 103 to the gear reducer 105. The gear reducer 105 reduces the RPM of the turbine to the desired rotation speed. The gear box 103 and the gear reducer 105 take a very high rotational speed, as high as 20,000 RPM for the first fan, and converts it to an acceptable RPM of between 1400-1500 RPM, which is acceptable for the pump 102. As noted above, these rotational speeds are provided for illustrative purposes only and should not be deemed limiting. In some embodiments the pump 102 has a further internal reducer.

While one embodiment has been shown wherein there is a separate gear box 103 and a separate gear reducer 105, in other embodiments a single gear box is utilized which reduces the RPM.

In one embodiment the drive shaft utilizes a simple shear pin or pins rather than a coupling. In one embodiment the drive shaft 104, or any shaft utilized in the system, comprises a pin system. Two or more components are coupled via a pin or pins. The pin will shear at a pre-determined torque. This is a way to prevent unplanned over torque events. Instead, when an undesirable torque is delivered to the shaft, the pin will shear, stopping rotation of the shaft. This protects the equipment and increases safety.

The pumps discussed herein can take many forms. In one embodiment the pump comprises a multi-plunger pump. The length of the plunger can vary. In one embodiment it has a stroke length of about 8" or longer. The plunger diameter can have a diameter of 4" or larger. In one embodiment the pump has a shaft which couples the power source to the pump. In one embodiment the pump utilizes a segmented or monoblock style fluid end assembly.

The pump can have various operational capabilities. In one embodiment the pump is capable of being operated at 15,000 psi. In one embodiment the pump is capable of handling up to 7,500 Hp and 60,000 lb-ft of torque.

In one embodiment the pump utilizes a power frame integral to the overall strength of the assembly. In one embodiment such a power frame would employ high strength rods or tubes which run transversely through the bearing housing. The purpose of this is arresting or reducing deflection of the bearing housings and/or power frame skin. The power frame can contain steel gussets added in high-stress areas for the purpose of arresting or reducing deflection of the bearing housings and or power frame skin.

In one embodiment it is capable of being connected directly to a transmission or drivetrain assembly via a flange or hub design. In one embodiment the pump is capable of being mounted directly to a single or multi-speed gear box with and without a neutral.

In one embodiment the pump is capable of being installed into an assembly where the engine is connected directly to the pump assembly (the pump and integral gear reduction/gear box). In one embodiment the pump is capable of being installed into an assembly where the engine is connected directly to the gear reduction which is connected directly to the pump assembly.

In one embodiment the pump is capable of being installed into an assembly where the engine is connected directly to a flanged drivetrain assembly, without use of a driveshaft, which is in turn connected directly to the pump. In one embodiment the pump is designed such that the velocity of each plunger is variable at different points in their travel, even when the input RPM remains constant.

In one embodiment the drive system is a direct drive whereby the drive shaft is directly and mechanically coupled. In other embodiments, however, the drive system is an indirect drive system. As an example, a first fan will blow onto a second fan. They do not directly mechanically couple but instead are indirectly driven by one another. This is discussed in more detail below.

Figure 6:
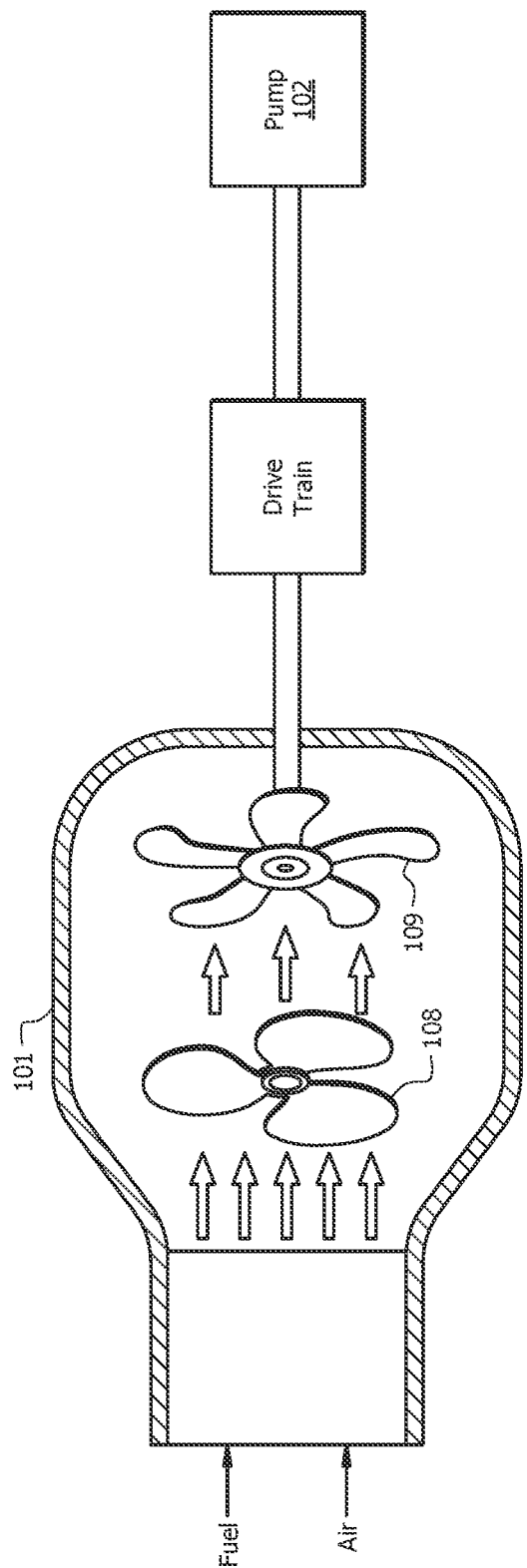
FIG. 6 is a schematic of a two fan system in one embodiment.

FIG. 6 depicts the two fan approach in one embodiment. As shown, fuel and air is mixed in the combustor. Then, within the turbine 101 housing are two fans: first fan 108 and second fan 19. The first fan 108 is in the air compressor section. The second fan 109 is in the output power turbine section. The dual-shaft turbine uses the power of the first fan 108 to turn the second fan 109. They are not directly coupled. The second fan 109 is coupled to the output shaft which is coupled to the drive train, and ultimately, the pump 102. This unique approach does not have the two fans directly coupled.

A turbine system, in on embodiment, comprises an air filtration system to ensure dirt and other undesirable particles do not end up in the turbine. Filtration systems require expensive filters which must be regularly changed. Accordingly, in one embodiment the air filtration system does not comprise any filters. Instead, the system comprises an air particle separator to aid in supplying the turbine with conditioned air while achieving a low pressure drop at the air intake. This improves horsepower output of the turbine itself improving overall efficiency of the system and reducing cost. Furthermore, replacing filters is often laborious and depending upon the location, potentially dangerous. Removing the need to replace expensive and time-consuming filters improves safety and reduces operating costs.

As noted, in one embodiment the air particle separator does not utilize a filter. Instead, the air particle separator comprises a centrifuge which uses centrifugal force to clean the air. The elimination of the filter increases airflow.

Figure 7:
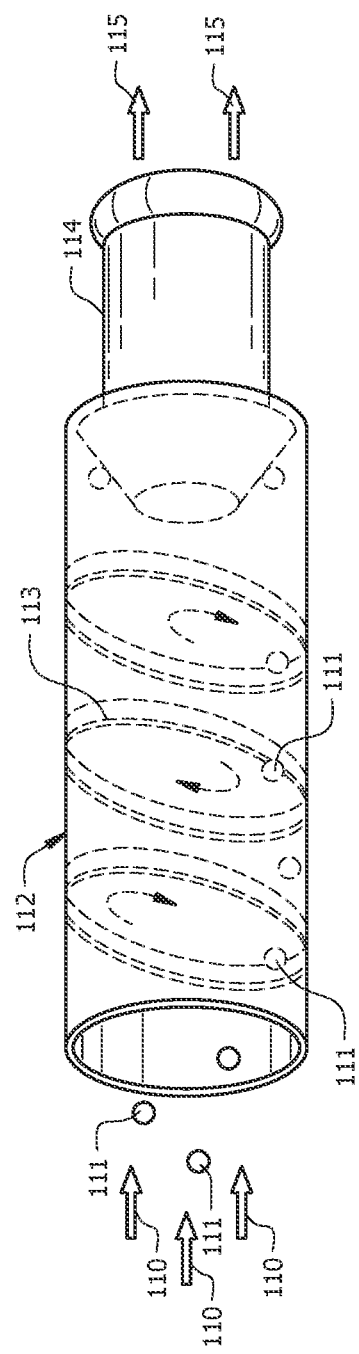
FIG. 7 is a schematic of an air particle separator in one embodiment.

FIG. 7 is a schematic of an air particle separator in one embodiment. The air separator has a filtration tube. Unfiltered air 110 enters an upstream end of the filtration tube 112. The filtration tube 112 has one or a plurality of vanes 113 along its inner periphery. The heavier particles 111 are thrown to the outer periphery by centrifugal force. They ride along the vanes 113 of the filtration tube 112. Filtered air 115 exits the downstream end of the filtration tube 112 and through the collection cup 114. As shown, particles 112 are collected atop the collection cup 114.

The particles 112 can be removed from the filtration tube 112 via several different mechanisms. In one embodiment the collection cup 114 is pulled downstream to allow the particles 111 to escape. In another embodiment one or more fans create a suction or pressure to pull or blow the particles 111 out of the filtration tube 112. This can be done at periodic times, or it can be accomplished when the weight or pressure sensors determine that sufficient particles 111 have been collected which need to be evacuated from the system. In another embodiment the particles are directed to a collection bin which collects particles from the filtration tube 112 for future disposal. The collection bin can be emptied as per above.

In one embodiment the system utilizes four separate 10,000 cfm filtration tubes 112. In one embodiment two filtration tubes are placed on each side of the turbine 101. In some embodiments the turbine 101 is bifurcated. Having two air separators in each side of the turbine 101 ensures that each side is provided equal access to air. Put differently, this eliminates one side being starved for air. This increases the efficiency out of the fuel burn.

The particle separator can comprise a variety of types of equipment. In one embodiment four Donaldson Particle Separators having a throughput of 10,000 cfm each are utilized. Additionally, two electric fans aid in evacuating the particle separators. Thus, each electric fan is coupled to two separators. This can vary and you can have one fan per particle separator or a single fan for all four particle separators. Additionally, in one embodiment, the air intake can be bifurcated with bellows.

In one embodiment the particle separator has no moving parts. This reduces the cost to treat the air compared to a conventional filter. Instead, the heavy particles are forced to the side via centrifugal force of the incoming air. As noted, the particle separator comprises no filter which clogs and which needs replacing. This ensures consistent and high quality air directed to the turbines.

In one embodiment the air particle separator comprises pressure sensors to determine if there is pressure loss. As an example, if an item obstructs the air inlet on the separator, the system can recognize this and shut down the engine or engines. Additionally, the system could send an alert.

In one embodiment the system and/or pump can utilize vibration suppression and dampening mounts. In one embodiment, aside or in addition to mounts, the pump can employ an optimized firing order of each plunger with the purpose of reducing system vibration, harmonics, and unwanted stress.

Figure 8A:
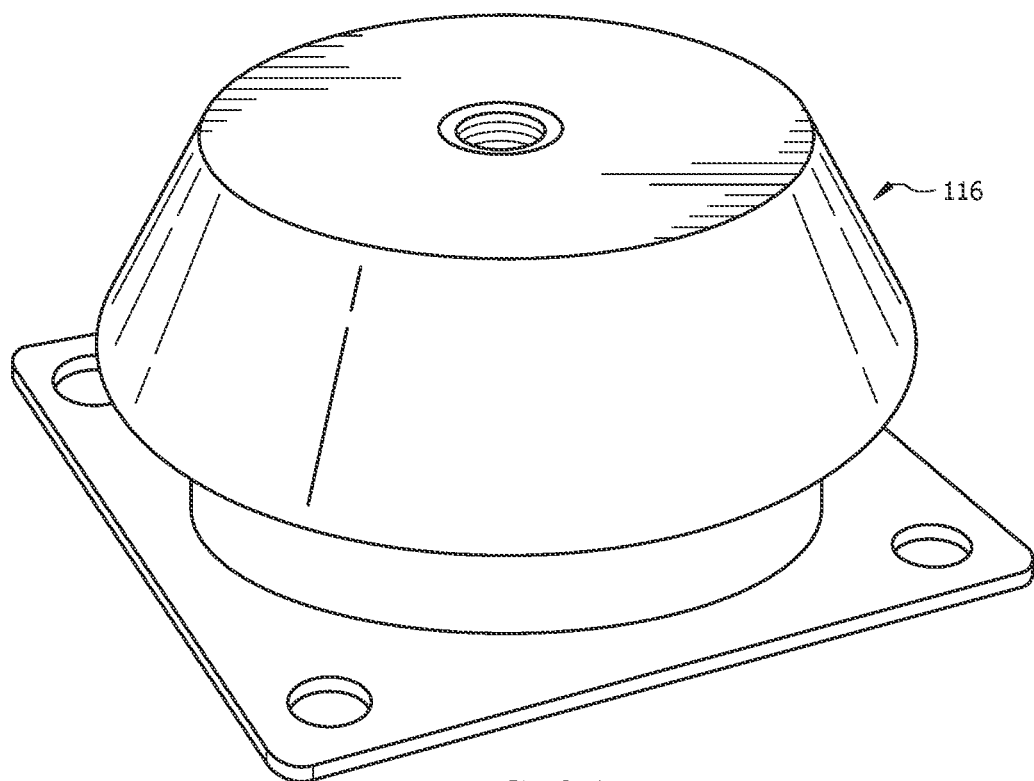
FIG. 8A is a perspective of a mount in one embodiment.
Figure 8B:
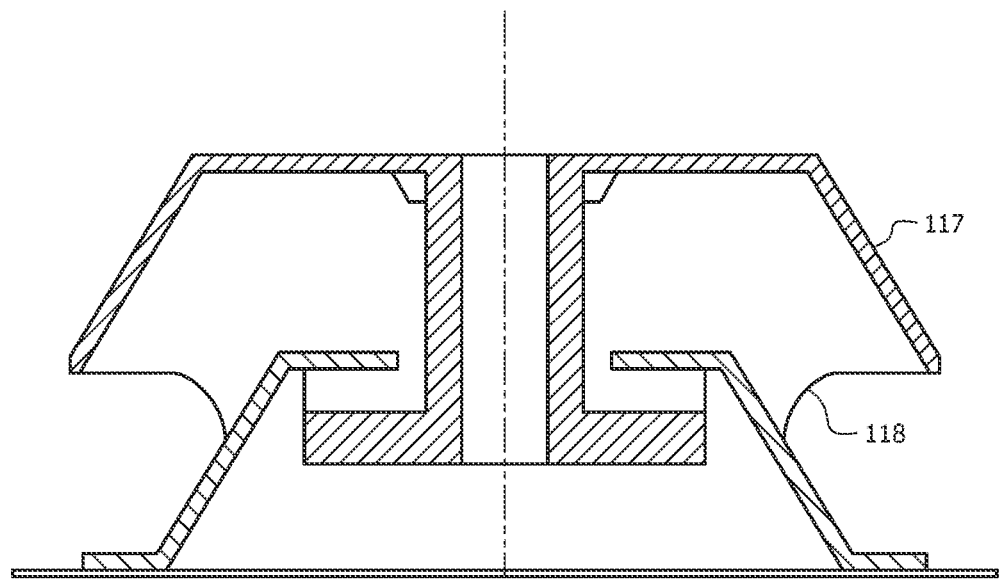
FIG. 8B is a side cross-section of the mount in one embodiment.

FIG. 8A is a perspective of a mount in one embodiment. FIG. 8B is a side cross-section of the mount in one embodiment. The mount 116 can be used to secure equipment to the trailer 107. As shown the mount has an outer mount 117 and an elastomer 118. The elastomer 118, or other similar component, absorbs the vibration and movement of the equipment. This extends the life of the equipment. Further it reduces the shock, impact, and/or vibration during transmit and operation. The mounts 116 are shown in FIG. 5.

As depicted in FIG. 5 the turbine 101 itself is not separately mounted to the trailer 107. Instead, the turbine 101 is mounted to a gear box which is mounted to the trailer via mounts 116. While the gear box is depicted as being mounted with mounts 116, this should not be deemed limiting as any equipment can be mounted with the mounts 116. Further, any type of mounts can be utilized.

As noted, vibration can impact and negatively affect the life of equipment. In one embodiment the pump discharge comprises a high pressure rubber hose connected to the discharge bridal. In one embodiment two adjacent discharge bridals are connected with the high pressure rubber hose. The rubber hose, in one embodiment, can withstand up to 15,000 psi. The hose comprises of rubber and braided wire and other materials. The rubber in the hose has a dampening effect compared to the rigid steel. This reduces the vibration at the pump, which increases the life of the components and overall safety of the pump.

Coupled to the gear reducer 105 is the turbine 101 previously discussed. Also coupled to the turbine is the exhaust system 106.

In one embodiment the exhaust is wrapped with aluminum on the outside. This provides heat proofing as the aluminum goes around the exhaust pipe. In certain embodiments, the system results in 60-70% reduced emissions. The exhaust gasses can be analyzed and monitored to assess engine health. In one embodiment a 65% reduction in carbon monoxide was achieved.

In one embodiment the exhaust pipe has a non-uniform diameter. A non-uniform diameter is a pipe or tube which has a diameter which is not constant and which changes along its length. In one embodiment the exhaust pipe has a diameter which increases along its length.

The trailer, as noted, can house all of the components necessary for operation of the frac pump. The trailer has the turbine 101, any necessary drive train, gear box, gear reduction, shafts, the pump 102, and the exhaust. While the term trailer is utilized, this is for illustrative purposes only and should not be deemed limiting. A truck, trailer, body load, etc. can be utilized in the same manner discussed herein.

In one embodiment the system requires no external electrical power. The system can utilize a generator, solar power, batteries, etc. In one embodiment the system utilizes the truck to provide the electrical power. In one embodiment the system utilizes a tractor Power Take Off (PTO) generator. The term tractor should be understood to mean any truck, tractor, or other system which provides mechanical energy. The system utilizes the truck or vehicle to power the PTO generator. The generator produces the electrical power necessary to power the system.

Once the system has arrived at the desired location, the trailer is parked. In embodiments wherein the trailer utilizes air bags to cushion the components, some or all of the air is released desired on the application. Next, the frac pump is connected to the associated manifolding/equipment required to perform work.

As noted, electrical power is required for the sensors, valves, etc. The electrical power can originate from the grid, generators, etc. In one embodiment, the power originates from a PTO generator.

The umbrella controller system is then activated. The fuel source is then connected and the system is operational. As noted, in one embodiment, the system is fully contained and does not rely upon any external electrical power. This allows the system to be placed in deeply remote locations.

As noted the system described herein has several benefits. First, because in some embodiments the system runs on natural gas, the system can be placed in remote locations without requiring separate utilities.

Second, the operating costs of the system, per Hydraulic Horsepower Hour is lower than prior art systems.

Third, the system integrates the control of a FADEC and frac control into a single umbrella frac controller which optimizes the unit's operations across a wide range of conditions. This results in the lowest Total Cost of Ownership (TCO) compared to prior art attempts.

Fourth, the system results in low-emissions. One reason for this is using natural gas as the fuel as opposed to diesel, in certain embodiments. This offers superior emission compared to diesel. As noted above, however, this system can use a wide variety of fuels. Accordingly, there are many environmental benefits compared to the prior art.

While the invention has been particularly shown and described with reference to a preferred embodiment, it will be understood by those skilled in the art that various changes in form and detail may be made therein without departing from the spirit and scope of the invention.

What is claimed is:

1. A system for a frac pump, said system comprising:
   a turbine housing coupled to a gear box;
   wherein said gear box is coupled to a frac pump;
   a controller to control said system;
   an air filtration system to treat the air entering the turbine housing;
   wherein said turbine housing is used to power said frac pump;
   wherein said turbine housing comprises a turbine controller, and wherein said controller controls said turbine controller;
   wherein said turbine housing comprises a first fan and a turbine, wherein said first fan is within a compressor section of said turbine housing, and wherein said turbine is in an output section of said turbine housing, and wherein said first fan powers said turbine, and wherein said turbine is coupled to an output shaft, and wherein said output shaft powers said frac pump.

2. The system of claim 1 wherein said system is located on a single trailer.

3. The system of claim 2 wherein said gear box is coupled to said trailer via a mount, and wherein said mount comprises an elastomer.

4. The system of claim 1 wherein said system requires no external electrical power.

5. The system of claim 1 further comprising an air filtration system, wherein said air filtration system comprises a filtration tube which comprises at least one vane.

6. The system of claim 5 wherein said air filtration system has a collector cup to collect filtered particles.

7. The system of claim 5 comprising four air filtration systems.

8. The system of claim 5 wherein said filtration tube is stationary, and wherein said air filtration system comprises no filter.

9. The system of claim 1 further comprising a drive shaft between said gear box and said pump.

10. The system of claim 9 wherein said drive shaft comprises at least one pin that sheers with a pre-determined torque range.

11. The system of claim 9 wherein said drive shaft is a floating drive shaft.

12. The system of claim 1 wherein said turbine is powered by natural gas.

13. The system of claim 1 wherein said pump comprises a multi-plunger pump.

14. The system of claim 1 comprising a plurality of pumps.

15. The system of claim 1 further comprising an exhaust system coupled to said turbine housing.

16. The system of claim 15 wherein said exhaust system comprises an exhaust pipe, and wherein said exhaust pipe comprises a non-uniform diameter.

17. The system of claim 1 wherein said first fan and said turbine are not mechanically coupled.

18. The system of claim 1 wherein said pump comprises a power frame.

* * * * *